US010134043B2

(12) United States Patent
Chan

(10) Patent No.: US 10,134,043 B2
(45) Date of Patent: Nov. 20, 2018

(54) METHOD AND SYSTEM FOR WIRELESSLY ACCESSING A NETWORK

(75) Inventor: Alwin Chan, San Carlos, CA (US)

(73) Assignee: EXCALIBUR IP, LLC, New York, NY (US)

(*) Notice: Subject to any disclaimer, the term of this patent is extended or adjusted under 35 U.S.C. 154(b) by 1814 days.

(21) Appl. No.: 11/837,853

(22) Filed: Aug. 13, 2007

(65) Prior Publication Data

US 2009/0048915 A1 Feb. 19, 2009

(51) Int. Cl.
*G06Q 30/00* (2012.01)
*G06Q 30/02* (2012.01)
*H04W 48/18* (2009.01)

(52) U.S. Cl.
CPC ......... *G06Q 30/02* (2013.01); *G06Q 30/0267* (2013.01); *H04W 48/18* (2013.01)

(58) Field of Classification Search
CPC .............................. H04L 12/14; G06Q 30/02
USPC ....................... 705/35–44; 709/227; 715/200
See application file for complete search history.

(56) References Cited

U.S. PATENT DOCUMENTS

| | | | | |
|---|---|---|---|---|
| 5,974,451 A * | 10/1999 | Simmons | ............... | G06Q 30/02 709/218 |
| 6,216,112 B1 * | 4/2001 | Fuller | .................... | G06Q 30/02 705/14.19 |
| 6,678,663 B1 * | 1/2004 | Mayo | ..................... | G06Q 20/02 235/379 |
| 6,732,176 B1 * | 5/2004 | Stewart | ................... | H04L 12/14 709/227 |
| 6,804,659 B1 * | 10/2004 | Graham | ................ | G06Q 30/02 705/14.49 |
| 7,653,875 B2 * | 1/2010 | Jennings | ........... | G06F 17/30899 715/200 |
| 2002/0016736 A1 * | 2/2002 | Cannon | .................. | G06Q 30/02 705/14.4 |
| 2002/0072973 A1 * | 6/2002 | Magoshi | ................ | G06Q 30/02 705/14.69 |
| 2002/0077900 A1 * | 6/2002 | Thompson | ............. | G06Q 30/02 705/14.68 |
| 2002/0152121 A1 * | 10/2002 | Hiroshi | ................ | G06Q 20/102 705/14.68 |
| 2003/0088517 A1 * | 5/2003 | Medoff | ........................... | 705/59 |
| 2007/0088852 A1 * | 4/2007 | Levkovitz | ..................... | 709/246 |
| 2008/0294997 A1 * | 11/2008 | Weitz | ..................... | G06Q 10/10 715/742 |

OTHER PUBLICATIONS

*Ultramercial, LLC v. Hulu, LLC and WildTangent*, _F.3d_, 112 USPQ2d 1750 (Fed. Cir. 2014).*

* cited by examiner

*Primary Examiner* — Olabode Akintola
(74) *Attorney, Agent, or Firm* — James J. DeCarlo; Greenberg Traurig, LLP

(57) ABSTRACT

Systems and methods for wirelessly accessing a network are set forth in this disclosure. Specifically, this disclosure sets forth systems and methods for using advertising to regulate wireless access to a network.

7 Claims, 6 Drawing Sheets

METHOD AND SYSTEM FOR WIRELESSLY ACCESSING A NETWORK

BACKGROUND

Increasingly, wireless network providers are utilizing wireless local area networks, including but not limited to networks based on the IEEE 802.11 (WiFi), the IEEE 802.16 (WiMAX) specifications and/or other wireless specifications (e.g., EDGE, GPRS, UMTS), to provide connectivity to wide area networks such as the Internet. In many cases, wireless networks utilize inexpensive consumer premises equipment (CPE) that provide a cheaper alternative to more traditional wired networks (e.g., cable, telephone, and satellite networks) that typically require high-fixed costs for the installation and maintenance of expensive head-end equipment.

Despite the cost-savings of wireless network CPE, the deployment of wireless networks may still require substantial up-front capital investment. Typically, wireless networks utilize line-of-sight transmission technologies that propagate radio signals within localized geographic regions. Thus, deployment of wireless networks over large geographic regions may require substantial numbers of otherwise inexpensive CPE. If wireless network providers, such as individuals, businesses and/or governments, desire to offer Internet connectivity to users on a free or reduced-cost basis (e.g., to encourage build out of Internet access), the deployment and maintenance of wireless network technology may result in little to no return on investment (ROI).

Currently, many wireless network providers offset these expenses by charging subscription fees to users for wireless access to the Internet. Other wireless network providers may charge other types of fees, including but not limited to hourly or usage-based fees for accessing the Internet. In each case, however, charging a fee to a user incurs significant overhead and requires additional costs for maintaining user information in confidence. Thus, what is needed are systems and methods for providing wireless access to the Internet that encourage Internet build-out and permit wireless network providers to recoup their ROI.

SUMMARY

Against this backdrop systems and methods have been developed for wirelessly accessing a network. In one embodiment (which embodiment is intended to be illustrative and not restrictive), a method for wirelessly accessing a network is provided. The method includes receiving, at a wireless access point, a network access request from a computing device wirelessly connected to the wireless access point, the wireless access point connected to the network via a service provider. The method further includes determining whether the computing device includes an advertising interface. The method also includes transmitting the advertising interface to the computing device only if it is determined that the computing device does not include the advertising interface. The method further includes retrieving advertising information from an advertising source, the advertising information renderable by the advertising interface. The method also includes transmitting the advertising information to the computing device. The method further includes connecting the computing device to the network. In one aspect, the method further includes notifying the computing device that network access requires the advertising interface and querying the computing device to include the advertising interface. In another aspect, the method includes retrieving the advertising interface from a remote computing device. In yet another aspect, the method includes regulating, by the wireless access point, at least one network access property of the computing device. In one aspect, regulating at least one network access property includes limiting at least the bandwidth, speed, or latency of the connection between the computing device and the network. In another aspect, the method includes regulating, by the service provider, at least one network access property of the computing device. In yet another aspect, regulating at least one network access property includes limiting at least the bandwidth, speed, or latency of the connection between the computing device and the network. In another aspect, the method includes receiving, by the service provider, compensation for the step of transmitting the advertising information, the compensation received from one or more vendors that supply the advertising information to the service provider. In yet another aspect, the method includes, receiving, by the service provider, compensation for the step of transmitting the advertising interface, the compensation received from one or more vendors that supply the advertising interface to the service provider. In still yet another aspect, the method includes receiving, by a provider of the wireless access point, compensation for the step of transmitting the advertising information, the compensation received from the service provider. In another aspect, the method further includes receiving, by a provider of the wireless access point, compensation for the step of transmitting the advertising information, the compensation received from one or more vendors that supply the advertising information. In yet another aspect, the method includes receiving, by a provider of the wireless access point, compensation for the step of transmitting the advertising interface, the compensation received from the service provider. In another aspect, the method includes receiving, by a provider of the wireless access point, compensation for the step of transmitting the advertising interface, the compensation received from one or more vendors that supply the advertising information. In yet another aspect, transmitting the advertising interface includes transmitting one or more executable files to the computing device. In still yet another aspect of the method, the one or more executable files renders a toolbar on the computing device. In another aspect of the method, the toolbar renders the advertising information. In yet another aspect of the method, transmitting the advertising interface includes retrieving one or more files from a network address corresponding to the advertising interface, the one or more files renderable by at least a portion of a display connected to the computing device and transmitting the one or more files to the computing device. In another aspect of the method, the one or more files are renderable by a browser. In yet another aspect of the method, the network access request identifies a location of the computing device and the method includes transmitting advertising information corresponding to the location of the computing device.

In another embodiment (which embodiment is intended to be illustrative and not restrictive), a method for wirelessly accessing a network is provided. The method includes receiving, at a wireless access point, a network access request from a computing device wirelessly connected to the wireless access point, the wireless access point connected to the network via a service provider. The method further includes determining that the computing device includes an advertising interface. The method includes retrieving advertising information from an advertising source, the advertising information renderable by the advertising interface. The method further includes transmitting the advertising information to the computing device. The method further yet includes connecting the computing device to the network. In one aspect, the method includes regulating, by the wireless access point, at least one network access property of the computing device. In another aspect of the method, regulating at least one network access property includes limiting at least the bandwidth, speed, or latency of the connection between the computing device and the network. In another aspect, the method includes regulating, by the service provider, at least one network access property of the computing device. In yet another aspect of the method, regulating at least one network access property includes limiting at least the bandwidth, speed, or latency of the connection between the computing device and the network. In another aspect, the method includes receiving, by the service provider, compensation for the step of transmitting the advertising information, the compensation received from one or more vendors that supply the advertising information to the service provider. In yet another aspect, the method includes receiving, by a provider of the wireless access point, compensation for the step of transmitting the advertising information, the compensation received from the service provider. In still yet another aspect, the method includes receiving, by a provider of the wireless access point, compensation for the step of transmitting the advertising information, the compensation received from one or more vendors that supply the advertising information. In one aspect of the method, the advertising interface comprises a toolbar. In another aspect of the method, the advertising interface comprises at least one web page frame. In still yet another aspect of the method, the network access request identifies a location of the computing device and the method includes transmitting advertising information corresponding to the location of the computing device. In another aspect of the method, the advertising interface is associated with the service provider or the wireless access point.

In another embodiment (which embodiment is intended to be illustrative and not restrictive), a method for wirelessly accessing a network is provided. The method includes receiving a request to access the network from a wireless device. The method further includes querying whether the wireless device includes an advertising interface. The method includes receiving confirmation that the wireless device includes the advertising interface. The method further includes, upon receiving the confirmation, providing network access to the wireless device. In one aspect, the method includes transmitting advertising information to the wireless device. In another aspect of the method, the advertising information corresponds to a vendor and the method includes receiving compensation from the vendor for transmitting the advertising information to the wireless device. In yet another aspect of the method, the advertising information corresponds to a user of the wireless device. In another aspect, the method includes prompting a user of the wireless device to accept transmission of advertising information to the wireless device for rendering within the advertising interface. In another aspect, the method includes receiving confirmation that the user of the wireless device accepts transmission of the advertising information and transmitting the advertising information to the wireless device. In yet another aspect, the method includes receiving confirmation that the user of the wireless device does not accept transmission of the advertising information and preventing network access to the wireless device. In one aspect of the method, the prompting requires the user to interact with a web page. In another aspect of the method, receiving the confirmation includes receiving an identification of the wireless device. In yet another aspect of the method, the identification of the wireless device is a globally unique identifier. In another aspect of the method, receiving the confirmation includes receiving an identification of a user account associated with the wireless device.

In another embodiment (which embodiment is intended to be illustrative and not restrictive), a system for wirelessly accessing a wide area network is provided. The system includes a wireless device including at least one advertising interface and having access to a local area network, wherein the wireless device is communicatively coupled to the local area network over which the wireless device can request access to the wide area network. The system further includes a gateway that receives, via the local area network, a request to access the wide area network from the wireless device and that provides wide area network access to the wireless device, wherein the provision of wide area network access to the wireless device is contingent upon the wireless device rendering advertising information via the advertising interface. In one aspect of the system, the gateway comprises a router. In another aspect of the system, the gateway retrieves the advertising information from the wide area network and transmits the advertising information to the wireless device. In yet another aspect of the system, the gateway includes at least one memory component for storing the advertising information and at least one processor that transmits the advertising information from the at least one memory component to the wireless device. In still yet another aspect of the system, the wide area network comprises the Internet.

In another embodiment (which embodiment is intended to be illustrative and not restrictive), a system for wirelessly accessing a wide area network is provided. The system includes a gateway that receives, via a local area network, a request to access the wide area network from a wireless device and that provides wide area network access to the wireless device, wherein the provision of wide area network access to the wireless device is contingent upon the wireless device rendering advertising information transmitted via the local area network. In one aspect of the system, the gateway comprises a router. In another aspect of the system, the gateway retrieves the advertising information from the wide area network and transmits the advertising information to the wireless device. In yet another aspect of the system, the gateway includes at least one memory component for storing the advertising information and at least one processor that transmits the advertising information from the at least one memory component to the wireless device. In still yet another aspect of the system, the wide area network comprises the Internet.

In another embodiment (which embodiment is intended to be illustrative and not restrictive), a system for wirelessly accessing a second network is provided. The system includes a gateway that receives, via a first network, a request to access the second network from a wireless device and that provides second network access to the wireless device, wherein the provision of the second network access to the wireless device is contingent upon the wireless device rendering advertising information transmitted via the first network. In one aspect of the system, the first network is a local area network. In another aspect of the system, the second network is a wide area network. In one aspect, the wide area network is the Internet. In another aspect of the system, the gateway comprises a router. In another aspect of the system, the gateway retrieves the advertising information from the second network and transmits the advertising information to the wireless device. In yet another aspect of the system, the gateway further includes at least one memory component for storing the advertising information, and at least one processor that transmits the advertising information from the at least one memory component to the wireless device.

In another embodiment (which embodiment is intended to be illustrative and not restrictive), a method for wirelessly accessing a network is provided. The method includes receiving, at a wireless access point, a network access request from a computing device wirelessly connected to the wireless access point, the wireless access point connected to the network via a service provider. The method further includes determining whether the computing device includes an advertising interface. The method further yet includes transmitting the advertising interface to the computing device only if it is determined that the computing device does not include the advertising interface. The method further includes retrieving advertising information from an advertising source, the advertising information renderable by the advertising interface. The method still further includes transmitting the advertising information to the computing device. The method further yet includes not connecting the computing device to the network if a user of the computing device does not accept transmission of the advertising information.

In another embodiment (which embodiment is intended to be illustrative and not restrictive), a method for wirelessly accessing a network is provided. The method includes receiving, at a wireless access point, a network access request from a computing device wirelessly connected to the wireless access point, the wireless access point connected to the network via a service provider. The method further includes determining whether the computing device includes an advertising interface. The method further yet includes transmitting the advertising interface to the computing device only if it is determined that the computing device does not include the advertising interface. The method further includes retrieving advertising information from an advertising source, the advertising information renderable by the advertising interface. The method still further includes transmitting the advertising information to the computing device. The method further yet includes not connecting the computing device to the network if a user of the computing device does not accept transmission of the advertising interface.

These and various other features as well as advantages will be apparent from a reading of the following detailed description and a review of the associated drawings. Additional features are set forth in the description which follows, and in part will be apparent from the description, or may be learned by practice of the described embodiments. While it is to be understood that both the foregoing general description and the following detailed description are exemplary and explanatory, the benefits and features will be realized and attained by the structure particularly pointed out in the written description and claims hereof as well as the appended drawings.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
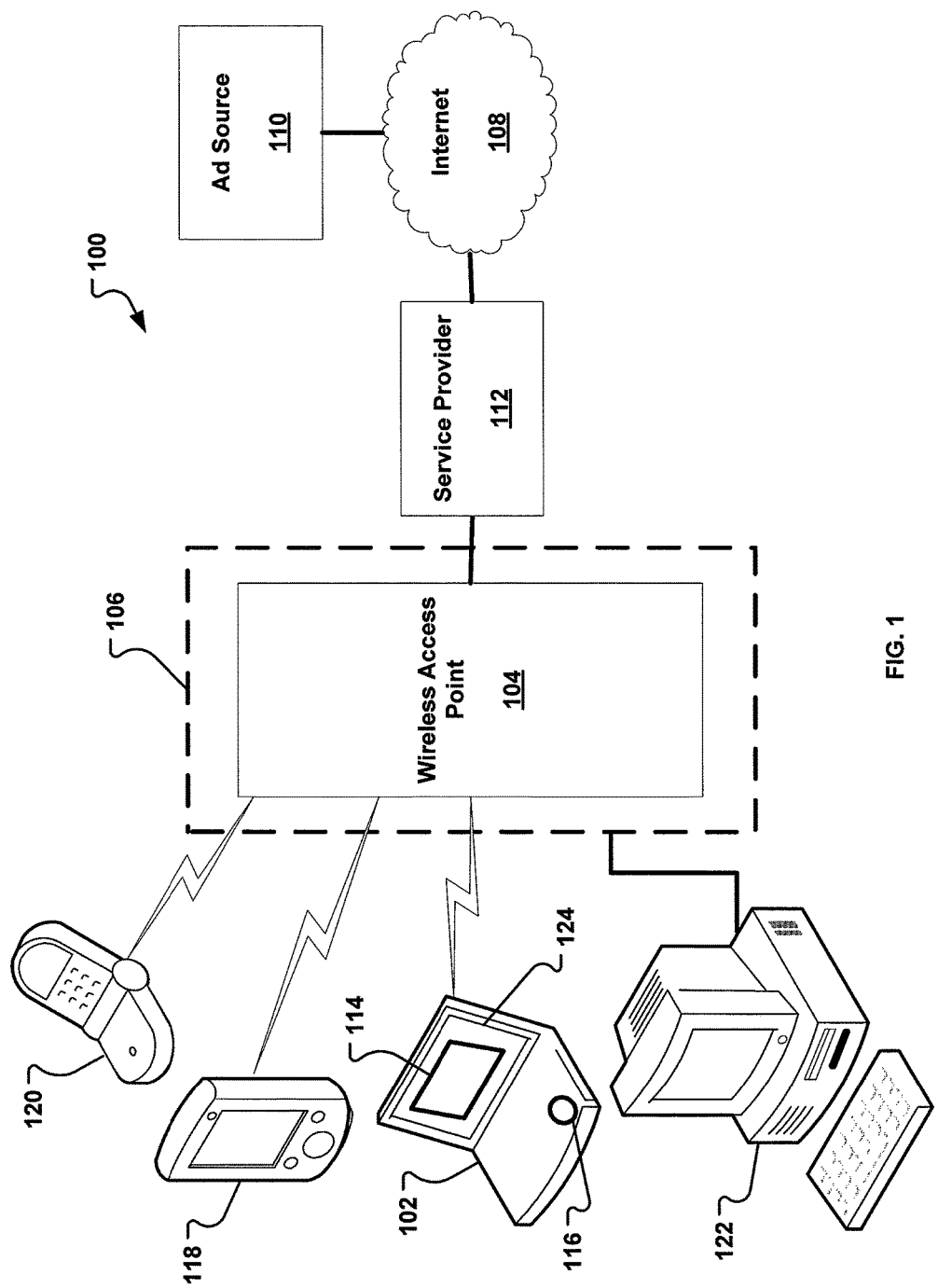
FIG. 1 illustrates an embodiment of a system for wirelessly accessing a wide area network.

The following detailed description is intended to convey a thorough understanding of the embodiments described by providing a number of specific embodiments and details involving systems and methods for wirelessly accessing a wide area network. It should be appreciated, however, that the claims appended hereto are not limited to these specific embodiments and details, which are exemplary only. It is further understood that one possessing ordinary skill in the art, in light of known systems and methods, would appreciate the applicability of this disclosure for its intended purposes and benefits in any number of alternative embodiments, depending upon specific design and other needs.

As set forth in this disclosure, including the claims and figures appended hereto, the term "network" refers generally to a plurality of computing devices, including but not limited to associated devices (e.g., switches, routers, hubs), that are communicatively connected. A network may include any number of wired or wireless and permanent or temporary connections between the computing devices.

For example, a network may comprise a "local area network" (LAN) or group of communicatively connected computing devices that are dispersed over a relatively limited geographic area. A LAN may include computing devices communicatively connected by a wired connection, for example, an Ethernet connection based on the IEEE 802.3 specification. Alternatively, a LAN may include computing devices communicatively connected by a wireless connection, for example, a WiFi connection based on the IEEE 802.11a/b/g/n specifications or a WiMAX connection based on the IEEE 802.16 specification. One skilled in the art will recognize that other network protocols are possible and within the scope of this application, including but not limited to current and future implementations based upon the 802.xx network protocols. The term "LAN" is used broadly within this disclosure, including the claims and figures appended hereto, such that it additionally includes other non-wide area networks (as described below), including but not limited to, metropolitan area networks (MANs), campus area networks (CANs), personal area networks (PANs), virtual private networks (VPNs) and cellular networks (e.g., cellular networks based upon the EDGE, GPRS, UMTS specifications). One skilled in the art will recognize that many other types of LAN connectivity and networks exist and are within the scope of this disclosure.

As another example, a network may comprise a "wide area network" (WAN) or a group of communicatively connected computing devices dispersed over a broad geographic area. The largest and most well-known example of a WAN is the Internet. A WAN may be one large network, or it may include a plurality of LANs and/or other types of networks that are communicatively connected together so that users and computers in one location can communicate with users and computers in other locations. For example, a first network comprising a LAN may be communicatively connected to a second network comprising one or more other LANs and/or a WAN (e.g., the Internet).

FIG. 1 illustrates an embodiment of a system 100 for wirelessly accessing a network such as the Internet 108. In one embodiment, the system 100 includes wireless devices 102, 118, 120. In an embodiment, the wireless devices 102, 118, 120 may comprise one or more computing devices, such as a laptop computer 102, mobile telephone 120, media player 118, personal digital assistant (not pictured), or other computing device. In another embodiment, the wireless devices 102, 118, 120 may comprise a plurality of computing devices that are communicatively connected. One skilled in the art will recognize that many types of wireless devices 102, 118, 120 exist and are within the scope of this disclosure.

As illustrated in the embodiment of the system 100, the wireless devices 102, 118, 120 include at least one advertising interface for rendering advertising information. For example, the advertising interface may comprise a software program, such as a browser program 114 (e.g., Microsoft Internet Explorer® or Mozilla Firefox®). As another example, the advertising interface may comprise other software, such as firmware (e.g., a mobile telephone 120 and media player 118 may include software that is embedded in one or more non-volatile memory components). One skilled in the art will recognize that software comprising the advertising interface may take many forms within the scope of this disclosure. As set forth in the present embodiment, the advertising interface renders, or facilitates rendering, of advertising information. For example, where the advertising interface comprises a browser program 114, the advertising interface may render advertising information for display on a screen 124 or other display or output device. As another example, the advertising interface may comprise software that facilitates rendering of audible advertising information (e.g., advertising announcements) on a speaker 116 or other output device. As another example, an advertising interface may comprise a toolbar (e.g., a toolbar, such as the Yahoo!® toolbar, may be integrated with a browser program), a media rendering program (e.g., Yahoo! Music JukeBox®, Apple iTunes® and Real Networks RealPlayer®), an applet or other program. As yet another example, an advertising interface may utilize other programs to render advertising information. For example, where advertising information comprises video data, an advertising interface may utilize a video player (e.g., Windows Media Player®) to render the advertising information. One skilled in the art will also recognize that output devices may take many forms within the scope of this disclosure. For example, output devices may include, but are not limited to, touch screens, LCD displays, and numerous other output devices. The wireless device 102 further includes a wireless connection to a wireless access point 104 that may be included as part of a gateway 106. For example, the wireless device 102 may be equipped with a network interface controller (NIC) or other network hardware and/or software for communicating with a wireless access point 104 and gateway 106. Typically, NICs provide physical access (OSI layer 1) and low-level addressing (OSI layer 2) network functionality.

As shown in the illustrated embodiment, the gateway 106 may include a wireless access point 104. As set forth in this disclosure, including the claims and figures appended hereto, a gateway may include one or more devices that connect one or more networks together such that information (i.e., data) may be passed between the networks. For example, a gateway 106 may connect networks using different communications protocols (e.g., a gateway may connect a network using the IPX/SPX protocol to a network using the TCP/IP protocol). Typically, a gateway 106 includes at least one connection (e.g., via a cable modem or DSL modem that is often provided by an Internet service provider (ISP)) that links one network (e.g., a LAN) to another network (e.g., the Internet 108). In one aspect, a gateway 106 may include a wireless access point (WAP) 104. A WAP 104 typically takes the form of a wireless router that includes one or more wireless connections, and may also include one or more wired connections. For example, a WAP implementing the IEEE 802.11b specification may communicate with thirty (30) wireless devices within a geographically limited radius of approximately one-hundred (100) meters. One skilled in the art will recognize that a WAP 104 may take many forms and implement numerous different specifications that are within the scope of this disclosure. One skilled in the art will also recognize that many configurations and permutations of hardware and software may be used within a gateway 106 and WAP 104. For example, a gateway 106 and/or a WAP 104 may further include wired connections (e.g., Ethernet connections) to various other computing devices, including but not limited to gateways, WAPs, and/or network devices (e.g., cable/DSL modems, hubs, switches).

As illustrated in FIG. 1, a gateway 106 may provide network (i.e., LAN) connectivity that permits communications between a computing device, such as a wireless device 102, and the gateway 106 and associated hardware and software such as a wireless access point 104. As set forth above, a LAN may comprise a group of computing devices that are dispersed over a relatively limited geographic area and that are communicatively connected. In one embodiment, a wireless LAN may utilize spread-spectrum communications for communicatively connecting one or more computing devices, such as a wireless device 102. One skilled in the art will recognize that a wireless device 102 may take many forms, including, but not limited to, personal computing devices that include a wireless connection, mobile computing devices that include a wireless connection, and/or other computing devices that include wireless connectivity.

In the illustrated embodiment of the system 100, a service provider 112 may be connected to the gateway 106. A service provider 112 typically comprises one or more computing devices for providing access to one or more other networks, such as one or more wide area networks. Typically, service providers 112 provide access to the Internet 108. Internet 108 access typically is provided through a variety of connectivity options, including, but not limited to, dial-up, DSL, ADSL, broadband wireless access, cable modems access, ISDN access, satellite access, and/or a variety of other network access technologies. In many cases, the service provider 112 may provide the hardware and/or software that comprise part of the gateway 106, including, but not limited to, a wireless access point 104. For example, a service provider 112 may provide a wireless access point 104 that is comprised within a cable modem that together provides access to one or more computing devices of the service provider 112, thus facilitating access to the Internet 108.

In the illustrated embodiment of the system 100, an advertising source 110 may be connected to the service provider, directly or indirectly, such that the advertising source may supply advertising information to the service provider and/or the gateway 106. An advertising source may comprise one or more computing devices corresponding to one or more advertising vendors or other third parties who provide advertising data for retrieval, download, and/or other transmission to the service provider 112 and/or gateway 106. Examples of advertising information include, but are not limited to, images, photographs, text, audio, video, and/or other data that together or in part may be transmitted to a wireless device 102 for rendering. Typically, advertising information may be rendered within a browser at a wireless device 102 or other computing device. Advertising information may be retrieved from an advertising source 110, with or without payment or other compensation paid to or from the advertising source 110 and the service provider 112. In one embodiment, the gateway 106 retrieves the advertising information from a wide area network, such as the Internet 108, and transmits the advertising information from an advertising source 110 to the wireless device 102. In one embodiment, the gateway 106 further comprises at least one memory component for storing advertisement information, and at least one processor for further transmitting the advertisement information from the at least one memory component to the wireless device 102. In another embodiment, the service provider 112 may retrieve advertising information from an advertising source 110 and temporarily or permanently store the advertising information. The service provider 112 may then transmit the advertising information to the wireless device 102 via the gateway 106.

Figure 2A:
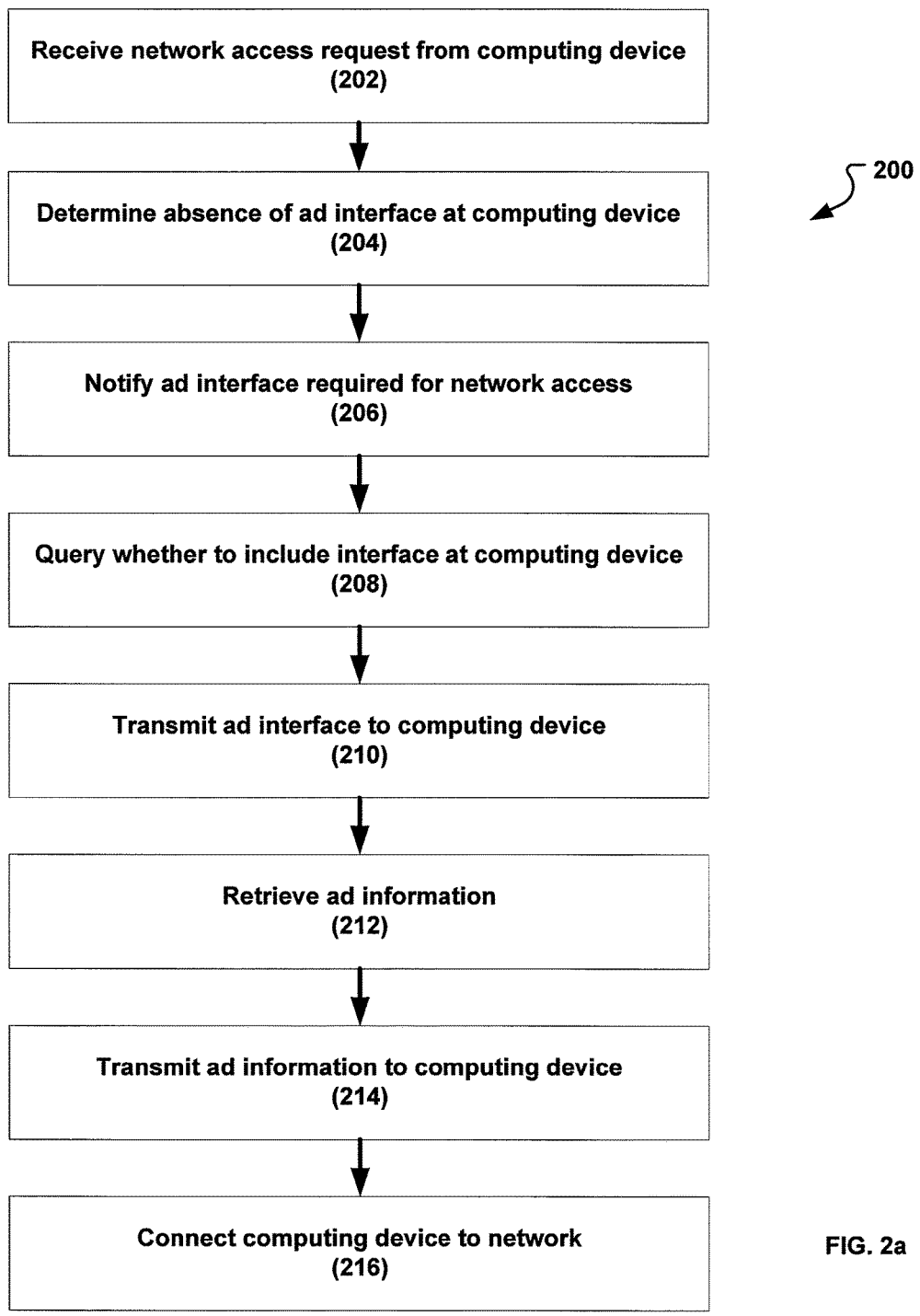
FIG. 2a illustrates an embodiment of a method for wirelessly accessing a network.

FIG. 2a illustrates an embodiment of a method 200 for wirelessly accessing a network. In the method 200, a network access request is received from a computing device in a receiving network access request operation 202. The network access request may be received at a wireless access point. In one embodiment of the receiving network access request operation 202, the network access request is received from a computing device that is wirelessly connected to the wireless access point. The wireless access point may be connected to a network, such as the Internet, via a service provider. In a determining operation 204 of the method 200, it is determined that a computing device does not include an advertising interface. An advertising interface may take many forms, including, but not limited to, hardware and/or software for rendering video and/or audio. For example, an advertising interface may include or utilize a browser (i.e., a software application for rendering and interacting with images, text and other information typically set forth on a web page) for rendering advertising information.

In one embodiment, in response to receiving a network access request in the receiving network access request operation 202 and determining that an advertising interface is absent from a computing device in determining operation 204, a user and/or a computing device may be notified that an advertising interface is required for network access in a notifying operation 206. In one aspect, the notification in a notifying operation 206 may take the form of a prompt requiring user input. In another aspect, the notification may take the form of a notice not requiring user input. In a further embodiment, a user and/or a computing device may request to include an advertising interface at the computing device in a receiving advertising interface request operation 208. In the method 200, an advertising interface may then be transmitted to the computing device in a transmitting advertising interface operation 210. An advertising interface may take many forms, as discussed previously. For example, an advertising interface may comprise software that renders, or facilitates rendering of, video, audio, text or other data.

In a retrieving operation 212, advertising information may then be retrieved for rendering on the computing device in a retrieving operation 212. One skilled in the art will recognize that advertising information may be stored and retrieved from within a gateway, a service provider, or some other service or computing device. In one embodiment, a gateway may comprise components (e.g., a processor and memory) for retrieving and temporarily storing the advertising information within the gateway. Advertising information may also be retrieved in retrieving operation 212 from an advertising source (e.g., an advertiser). In the method 200, advertising information is then transmitted to the computing device in a transmitting advertising information operation 214 for rendering at the computing device. In response to transmitting the advertising information in the transmitting advertising information operation 214, the computing device is then connected to a network in a connecting operation 216. One skilled in the art will recognize that many ways of connecting a computing device to a network such as the Internet are possible and within the scope of this disclosure. For example, using a variety of network hardware (e.g., switches, routers, hubs) an ISP may establish a TCP/IP connection with a computing device and permit the computing device to transmit information to and from the Internet via the connection.

In one embodiment, the method 200 further comprises retrieving an advertising interface from a remote computing device. For example, a Flash® application may be retrieved from an advertising source, such that advertising information rendered within the Flash® application may be transmitted, along with the Flash® application, for rendering within a browser at the computing device. In another embodiment, the method 200 may further comprise regulating, by the wireless access point, at least one network access property of a computing device and/or a network interface component of the computing device. The bandwidth available to a computing device for accessing a wireless access point and/or the network may comprise a network access property. A network property may also include the speed (e.g., processing speed, actual transmission speed) or maximum bandwidth capability of the computing device. Alternatively, a network access property may comprise a regulated or permissible latency for the connection between the computing device and the network. In one embodiment, a service provider may itself regulate at least one network access property of the computing device. For example, the service provider may regulate the bandwidth available to the computing device, the speed of the connection by which the computing device may access a wireless access point or other network device, or the latency inherent or permitted for the connection between the computing device and the network.

In one embodiment, the method 200 may further comprise receiving, by a service provider and/or a provider of the wireless access point, compensation for the step of transmitting advertising information to the computing device 214. The compensation received by the service provider and/or a provider of the wireless access point may originate from one or more vendors that may supply the advertising information to the service provider. Compensation may take the form of monetary compensation. Alternatively, compensation may take the form of credits (e.g., network access credits) or other forms of payment. In another embodiment of the method 200, the service provider and/or a provider of the wireless access point may be compensated for the step of transmitting the advertising interface. Compensation, again, may be received from one or more vendors that supply the advertising interface to the service provider and/or a provider of the wireless access point.

In one embodiment of the method 200, transmission of the advertising interface 210 may comprise transmitting one or more executable files to the computing device. For example, transmission of the advertising interface 210 may include transmission of browser software and/or one or more programs associated with a browser that may be used to render advertising information. As another example, transmission of an advertising interface 210 may comprise transmitting a toolbar for use within a browser. A toolbar may comprise one or more executable files that, when executed, may render the advertising information at the computing device. In another embodiment, the transmission of an advertising interface 210 may comprise retrieving one or more files from a network address that corresponds to an advertising interface. The one or more files may be renderable by at least a portion of a display (e.g., a browser) that is connected to a computing device. The one or more files may be transmitted to the computing device and may permit rendering of advertising information. For example, a Flash® application or a Java® application or applet may be retrieved from a network address and executed by a browser on a computing device, such that advertising information may be rendered within the Flash® application or Java® application or applet.

In another embodiment of the method 200, a network access request 202 may identify a location of a computing device, and the method 200 may further comprise transmitting advertising information that corresponds to the location of the computing device. For example, a network access request in a receiving network access request operation 202 may include information identifying a zip code or account number of a user associated with the computing device. Alternatively, a receiving a network access request operation 202 may include information identifying the location of a gateway, wireless access point, router or other hardware communicatively connected to the computing device. Identifying the location of the computing device, or a device communicatively connected to a computing device, may permit the advertising information to be tailored to the location of the device(s). For example, local advertising that corresponds to an identified zip code may be included as part of the advertising information transmitted to the computing device in a transmitting advertising information operation 214.

In another embodiment of the method 200, a user of the computing device may not accept transmission of either transmission of the advertising interface and/or transmission of the advertising information. For example, a user may be prompted to accept transmission of advertising information to their computing device. The user may desire not to receive advertising information and thus may not accept such a transmission. In such a circumstance, the computing device may not be connected from the network or disconnected from the network (e.g., where the computing device was previously connected to the network).

Figure 2B:
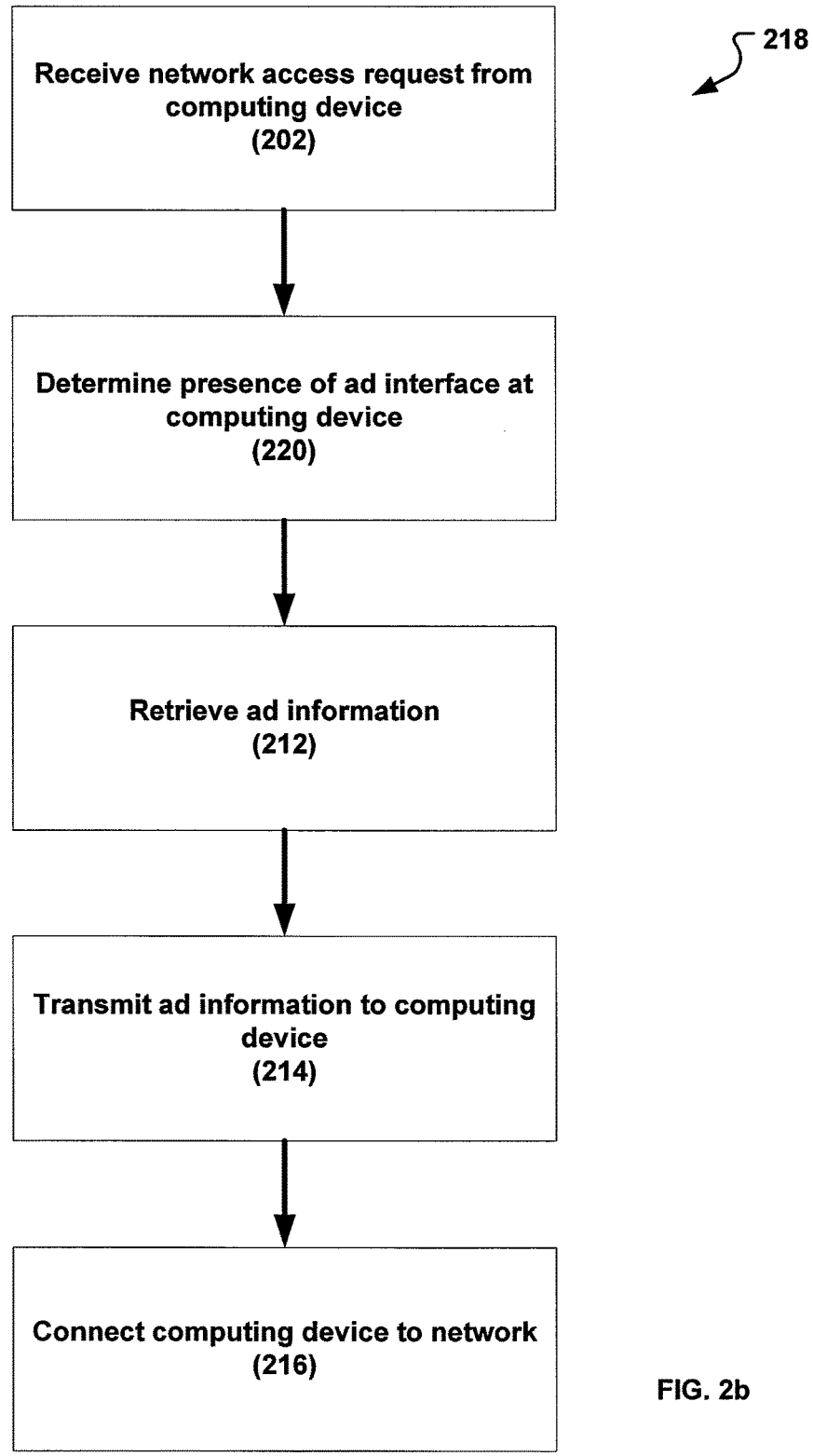
FIG. 2b illustrates an embodiment of a method for wirelessly accessing a network.

FIG. 2b illustrates an embodiment of another method 218 for wirelessly accessing a network. Similar to the previous discussion regarding the method 200 and FIG. 2a, the method 218 includes a receiving network access request operation 202 whereby a network access request is received from a computing device. The method 218 also includes a retrieving advertising information operation 212, transmitting advertising information operation 214, and a connecting operation 216. The method 218 further includes a determining the presence of an advertising interface operation 220 that determines the presence of an advertising interface for rendering advertising information. A determining the presence of an advertising interface operation 216 may comprise receiving a confirmation that a computing device has certain hardware and/or software. For example, a computing device may confirm that the computing device includes a browser or identify the name and/or other information (e.g., version number) about the browser. A determining the presence of an advertising interface operation 220 may be included as part of the receiving a network access request operation 202. For example, the receiving a network access request operation 202 may include data that identifies the advertising interface or otherwise indicates a previous determination that an advertising interface is present at the computing device. Alternatively, or in addition, the determining the presence of an advertising interface operation 220 may transmit a request to the computing device to confirm the existence of an advertising interface and receive a confirmation of the presence of the advertising interface from the computing device. One skilled in the art will recognize that many ways of confirming the presence of an advertising interface are possible and within the scope of this disclosure.

Figure 3:
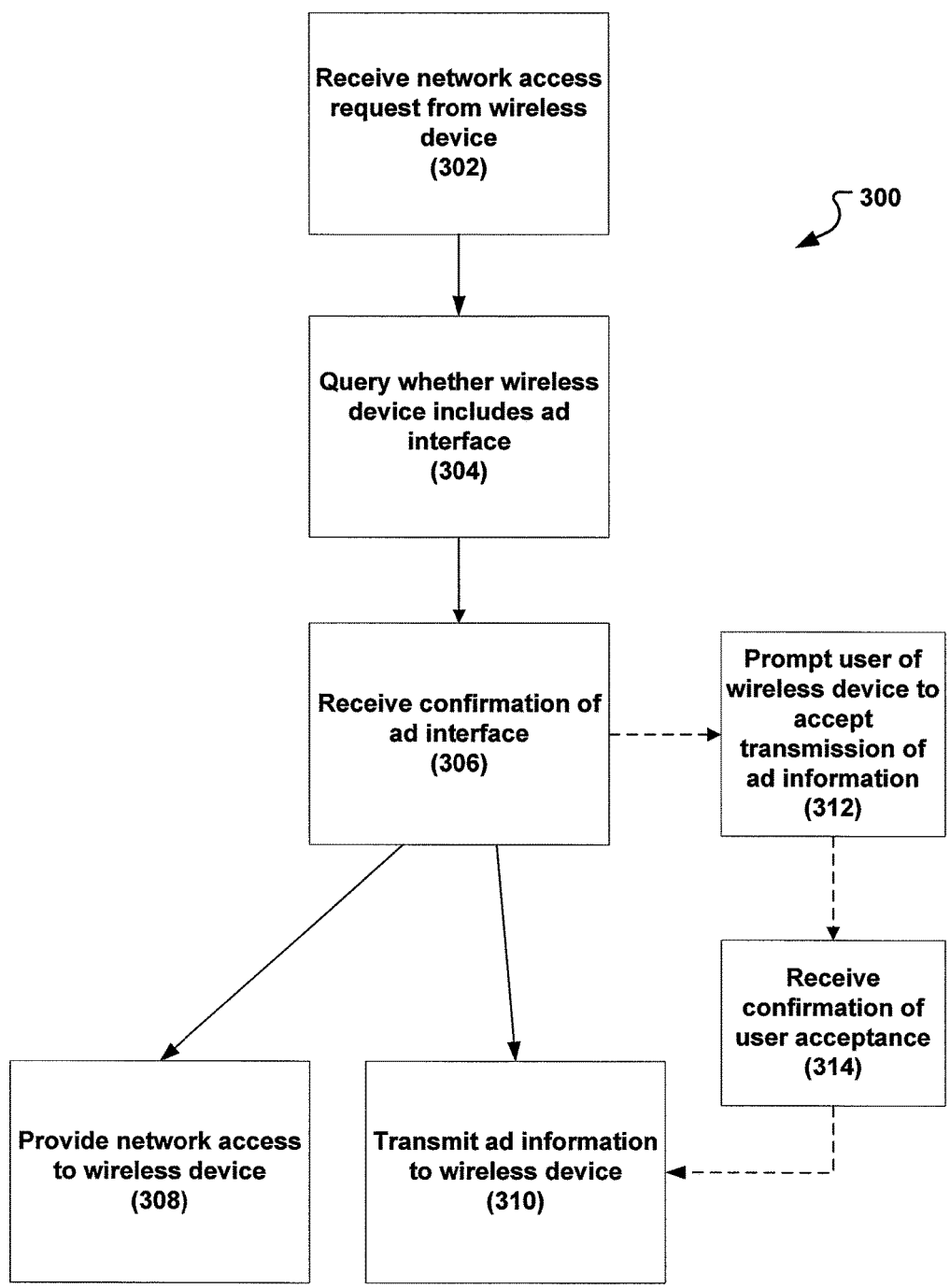
FIG. 3 illustrates an embodiment of another method for wirelessly accessing a network.

FIG. 3 illustrates an embodiment of a method 300 for wirelessly accessing a network. In the method 300, a network access request is received from a wireless device in a receiving network access request operation 302. As described previously, the network access request may take many forms. Typically, a network access request will take the form of data that identifies a network location (e.g., beyond network locations managed by a gateway communicatively connected to the wireless device) requiring network access. For example, where a wireless device requests access to a remote computing device (e.g., a computing device serving the web page corresponding to an address outside of the WLAN that includes the wireless device), identification of a web page address corresponding to the address outside of the WLAN may act as the request. Alternatively, a network access request may comprise data that overtly requests general or specific access to a larger network. For example, a user may affirmatively request network access without identifying a particular web page address requiring network access.

In a querying operation of method 300, the wireless device is queried to determine whether the wireless device includes an advertising interface. For example, where a wireless device comprises a laptop computer that is wirelessly connected to a gateway, the gateway may query or transmit information to the laptop computer that requests the laptop computer to confirm (i.e., send back data that confirms) the existence of an advertising interface (e.g., a browser program). In a receiving advertising interface confirmation operation 306, data that confirms the existence of the advertising interface is received from the wireless device. In one aspect, a receiving advertising interface confirmation operation 306 may identify the wireless device and/or programs or other data associated with the wireless device. For example, a confirmation received from the wireless device may include a globally unique identification (GUID).

In a network access operation 308, the wireless device is then connected to one or more networks (e.g., the Internet). In one embodiment, connecting the wireless device to one or more networks in a network access operation 308 may further comprise transmitting advertising information to the wireless device in a transmitting advertising information operation 310. In one aspect, the advertising information transmitted to the wireless device may correspond to a vendor. In another aspect, compensation may be received from the vendor for transmission of the advertising information (e.g., advertising promoting the vendor) to the wireless device. In another aspect, the advertising information transmitted to the wireless device may correspond to a user. For example, advertising information may correspond to a user account history (e.g., past purchases) or past network activity (e.g., gambling advertisements may correspond to a user's past interaction with web pages associated with gambling).

In another embodiment, the method 300 may further comprise a prompting user operation 312 wherein a user of a wireless device is prompted to accept transmission of advertising information for rendering within an advertising interface at the wireless device. For example, a prompt may comprise sending a web page to a user that describes terms of service (i.e., for obtaining network access that is contingent upon rendering advertising information) and requests the user to interactively acknowledge their acceptance of the terms of service. The user of the wireless device may then confirm the user's acceptance to transmit (and thus render) advertising information in a receiving confirmation of user acceptance operation 314.

Figure 4:
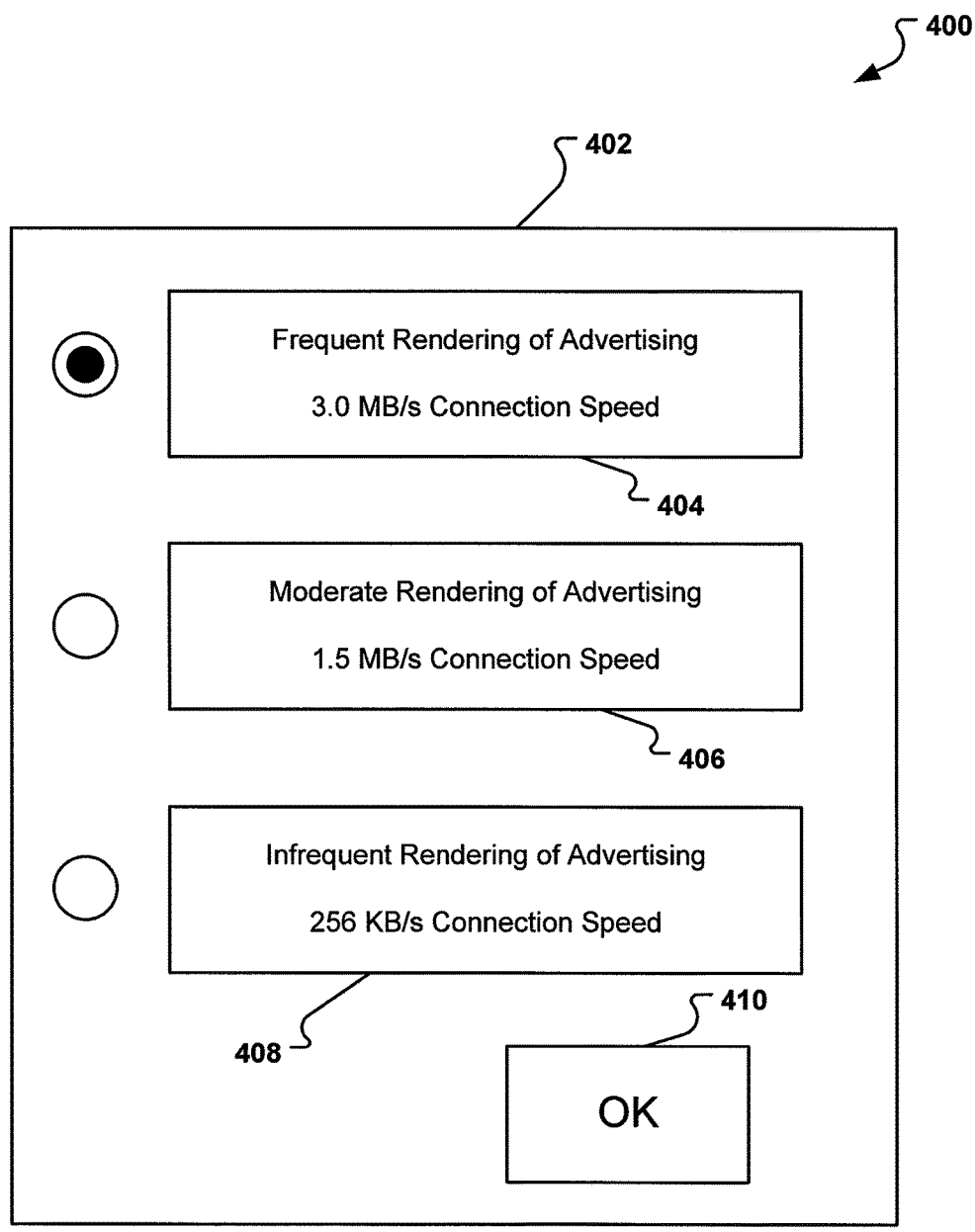
FIG. 4 illustrates an embodiment of a graphical user interface for a method of wirelessly accessing a network.

FIG. 4 illustrates an embodiment of a graphical user interface (GUI) 400 for a method of wirelessly accessing a network. The GUI 400 illustrates a dialog box 402 that may be presented to a user of a computing device that includes an advertising interface. For example, upon determining that a computing device includes an advertising interface, a dialog box 402 may prompt a user of the computing device to accept one of three selection criteria 404, 406, 408. In one embodiment, the selection criteria 404, 406, 408 provide a user to select 410 a connection speed or other transmission property (e.g., bandwidth, latency, etc.) that corresponds to an amount or frequency of advertising information rendered at the computing device. For example, a first selection criteria 404 may provide a fast connection speed (e.g., 3.0 Mbit/s) in exchange for more frequent rendering of advertising information at the computing device. Similarly, a second selection criteria 406 may provide a moderate connection speed (e.g., 1.5 Mbit/s) in exchange for the moderate rendering of advertising information at the computing device. As another example, a third selection criteria 408 may provide a slow connection speed (e.g., 256 Kbit/s) in exchange for infrequent rendering of advertising information at the computing device.

Figure 5:
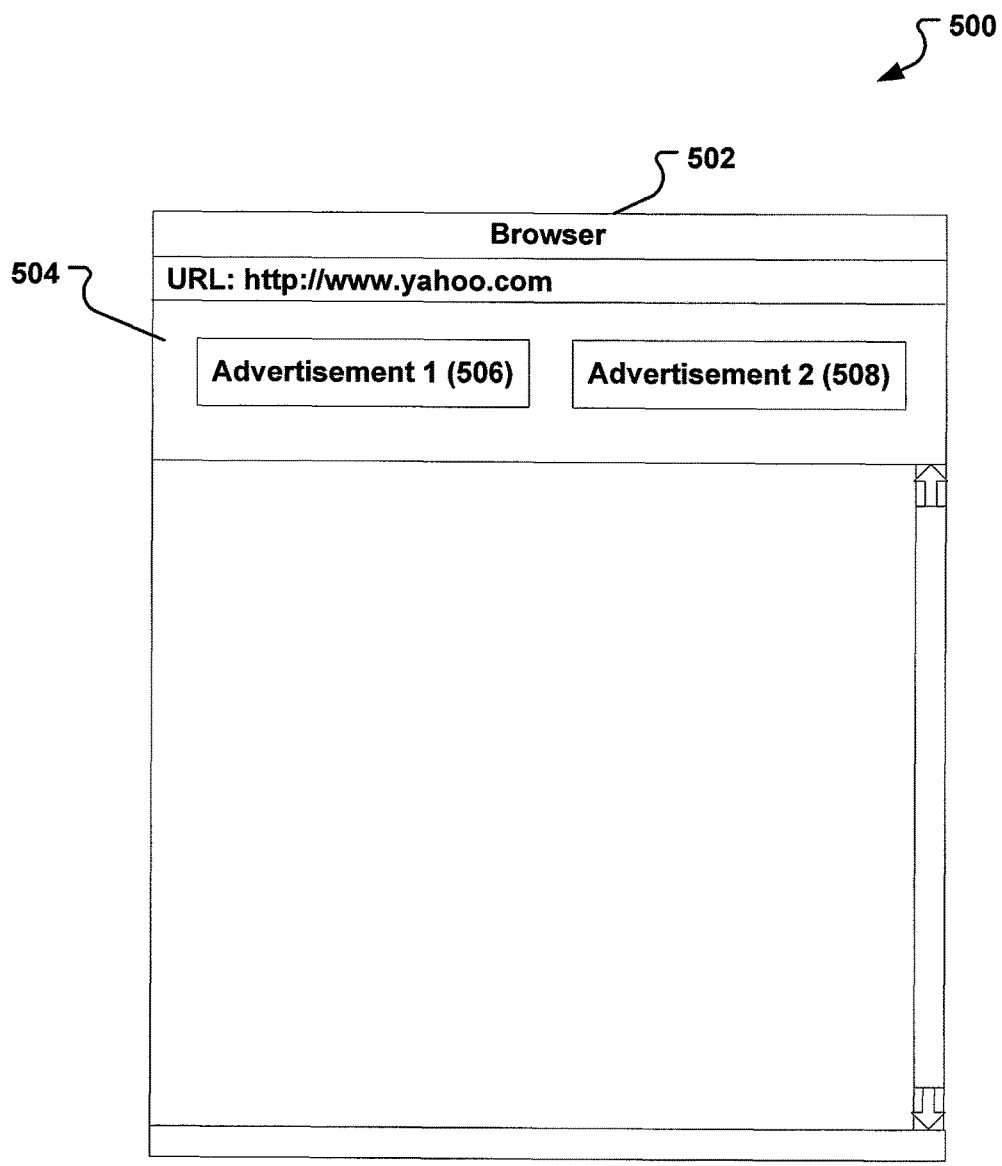
FIG. 5 illustrates an embodiment of an advertising interface for rendering advertising information.

FIG. 5 illustrates an embodiment of an advertising interface 500 for rendering advertising information. As previously discussed with respect to FIG. 1, an advertising interface 500 may comprise a toolbar 504, for example the Yahoo!® toolbar. The toolbar 504 may be associated with or integrated within a program, such as a browser program 502. As further described with respect to FIG. 1, the advertising interface 500 renders, or facilitates rendering, of advertising information 506, 508. For example, a browser program 502 may render advertising information 506, 508 in the form of images (i.e., "Advertisement 1" and "Advertisement 2") for display on a screen 124 or other display or output device.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of this disclosure. For example, advertising interfaces may permit rendering of non-advertising information such as news, sports, or other data. As another example, user access to an advertising interface may be disabled such that an ISP or other service provider may exercise control over the rendering of information by the advertising interface. Numerous other changes may be made which will readily suggest themselves to those skilled in the art and which are encompassed in the spirit of this disclosure and as defined in the appended claims.

What is claimed is:

1. A method comprising:
   receiving, at an Internet service provider (ISP) server, a network access request from a computing device wirelessly connected to a wireless access point, the wireless access point connected to a network via the service provider;
   determining, via the ISP server, that the computing device comprises browser functionality comprising a displayable interface for rendering a particular type of content;
   upon determining the computing device comprises the browser functionality, retrieving, via the ISP server, media information from a media source that is renderable by the interface of the browser;
   transmitting, via the ISP server, the media information to the computing device based at least partially upon selected selection criteria, the selection criteria comprising network transmission properties comprising a user selected rendering frequency of the media information at the computing device;
   electronically connecting, via the ISP server, the computing device to the network in accordance with the network transmission properties and based on the determination that the computing device includes the browser functionality for rendering the particular type of content within the displayable interface;
   identifying, via the ISP server, an amount of the media information transmitted to the computing device;
   regulating, via the ISP server, at least one network access property of the electronic connection between the computing device and the network based upon said amount of the media information transmitted to the computing device;
   determining, via the ISP server, whether said transmission of said media information is accepted by said computing device; and
   disconnecting, via the ISP server, the computing device from the network when said transmission of the media information is determined to not have been accepted.

2. The method of claim 1 wherein the displayable interface of the browsing application comprises a displayable toolbar.

3. The method of claim 1 wherein the displayable interface of the browsing application comprises at least one web page frame.

4. The method of claim 1 wherein the network access request identifies a geographic location of the computing device and the method further comprises:
   transmitting media information corresponding to the geographic location of the computing device.

5. The method of claim 1 wherein the displayable interface of the browsing application is associated with the service provider or the wireless access point.

6. The method of claim 1, wherein said media information comprises at least one digital image comprising digital advertisement content.

7. The method of claim 1, wherein said at least one network access property comprises a latency, processing speed, transmission speed and bandwidth.

\* \* \* \* \*